US009713233B1

(12) United States Patent
Castillo et al.

(10) Patent No.: US 9,713,233 B1
(45) Date of Patent: Jul. 18, 2017

(54) METHODS AND APPARATUS FOR WIRELESS COMMUNICATION AND POWER TRANSFER FOR AN EXTERNAL LIGHT FIXTURE ONBOARD A VEHICLE

(71) Applicant: GM GLOBAL TECHNOLOGY OPERATIONS LLC, Detroit, MI (US)

(72) Inventors: Gregory M. Castillo, Windsor (CA); Moshe Laifenfeld, Haifa (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/984,021

(22) Filed: Dec. 30, 2015

(51) Int. Cl.
*H05B 37/02* (2006.01)
*F21S 8/10* (2006.01)

(52) U.S. Cl.
CPC ......... *H05B 37/0272* (2013.01); *F21S 48/31* (2013.01); *H05B 37/0236* (2013.01)

(58) Field of Classification Search
CPC ............ H05B 37/0272; H05B 33/0803; H05B 33/0806; H05B 37/0218; H05B 37/0227; H05B 37/0236; H05B 33/0845; H05B 37/0281

USPC .................................................... 315/76–84
See application file for complete search history.

(56) References Cited

U.S. PATENT DOCUMENTS

| 2,343,754 | A | 3/1944 | Donley |
| 5,264,997 | A | 11/1993 | Hutchisson et al. |
| 5,765,940 | A | 6/1998 | Levy et al. |
| 2005/0258947 | A1 | 11/2005 | Kunianski |
| 2006/0028830 | A1 | 2/2006 | Tsai |
| 2010/0054734 | A1* | 3/2010 | Hosking ............ H04B 10/2503 398/25 |
| 2016/0171790 | A1* | 6/2016 | Abraham ................. B63G 8/41 342/53 |

FOREIGN PATENT DOCUMENTS

| CN | 202392503 U | 8/2012 |
| CN | 202675162 U | 1/2013 |

* cited by examiner

*Primary Examiner* — Tuyet Vo
(74) *Attorney, Agent, or Firm* — Lorenz & Kopf, LLP

(57) ABSTRACT

A method for using an external lamp onboard a vehicle is provided. The method receives, at a transceiver positioned inside a sealed casing of the external lamp, a wireless communication signal and a wireless power signal; and operates the external lamp using the wireless communication signal and the wireless power signal.

10 Claims, 2 Drawing Sheets

METHODS AND APPARATUS FOR WIRELESS COMMUNICATION AND POWER TRANSFER FOR AN EXTERNAL LIGHT FIXTURE ONBOARD A VEHICLE

TECHNICAL FIELD

Embodiments of the subject matter described herein relate generally to wireless communication and wireless power transfer. More particularly, embodiments of the subject matter relate to wireless communication and wireless power transfer for devices onboard a vehicle, such as a light fixture.

BACKGROUND

External automotive lamps or light fixtures include either a connector or a wire harness that extends outside of the lamp itself and links to a connector in a sheet metal "pocket" that holds the lamp. As implemented currently, external automotive lamps leak. Through connector or wire harness openings, water or other debris may enter the trunk compartment or the automotive lamp. This water leakage is most commonly associated with body sheet metal variation, resulting in poorly fitting body gasket seals and/or poorly sealed external connectors. The intrusion of water may reduce the life of the automotive lamp and the vehicle, incurring warranty costs. In addition, assembling automotive lamps with body seal gaskets is often difficult, and may result in a less than optimal lamp-to-vehicle seal.

Accordingly, it is desirable to provide a more effective seal to protect an automotive lamp and the vehicle to which it is attached. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for using an external lamp onboard a vehicle. The method receives, at a transceiver positioned inside a sealed casing of the external lamp, a wireless communication signal and a wireless power signal; and operates the external lamp using the wireless communication signal and the wireless power signal.

Some embodiments of the present disclosure provide a light fixture apparatus for use onboard a vehicle. The light fixture apparatus includes: a sealed external housing, configured to encase the light fixture apparatus; a transceiver positioned inside the sealed external housing, the transceiver configured to receive a wireless communication signal and a wireless power signal; and at least one processor positioned inside the sealed external housing, the at least one processor configured to operate the light fixture apparatus, using the wireless communication signal and the wireless power signal.

Some embodiments of the present disclosure provide a system for using an external light fixture onboard a vehicle. The system includes: a first transceiver embedded in a sheet metal pocket for holding the external light fixture, the first transceiver configured to wirelessly transmit a communication signal and a power signal; a second transceiver positioned inside the external light fixture, the second transceiver configured to wirelessly receive the communication signal and the power signal; and at least one processor communicatively coupled to the second transceiver, the at least one processor configured to: interpret the communication signal and the power signal; and operate the external light fixture using the communication signal and the power signal, based on the interpretation.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to methods and apparatus used to operate an external light fixture onboard a vehicle using wireless communication and power signals. The external light fixture includes a transceiver positioned inside a completely sealed housing. In certain embodiments, the external light fixture is generally wireless (i.e., not connected with wiring), and receives communication and power signals via the transceiver. A system for controlling the external light fixture includes another transceiver that receives communication signals and power signals from a control module, and wirelessly transmits these communication signals and power signals to the external light fixture. In certain embodiments, communications between the light fixture and the system for controlling the external light fixture are bidirectional.

Certain terminologies are used with regard to the various embodiments of the present disclosure. A vehicle may be, without limitation, any one of a number of different types of types of automobiles (cars, trucks, motorcycles, sport-utility vehicles, vans, etc.), aviation vehicles (such as airplanes, helicopters, etc.), watercraft (boats, ships, jet skis, etc.), trains, all-terrain vehicles (snowmobiles, four-wheelers, etc.), military vehicles (Humvees, tanks, trucks, etc.), rescue vehicles (fire engines, ladder trucks, police cars, emergency medical services trucks and ambulances, etc.), spacecraft, hovercraft, and the like. An external light fixture may also be referred to as an external lamp or an automotive lamp, and may be implemented using any light fixture or luminary device affixed to, and operated by, a vehicle. A transceiver may be implemented using a standard radio transceiver and/or one or more transmitter-receiver pairs.

Figure 1:
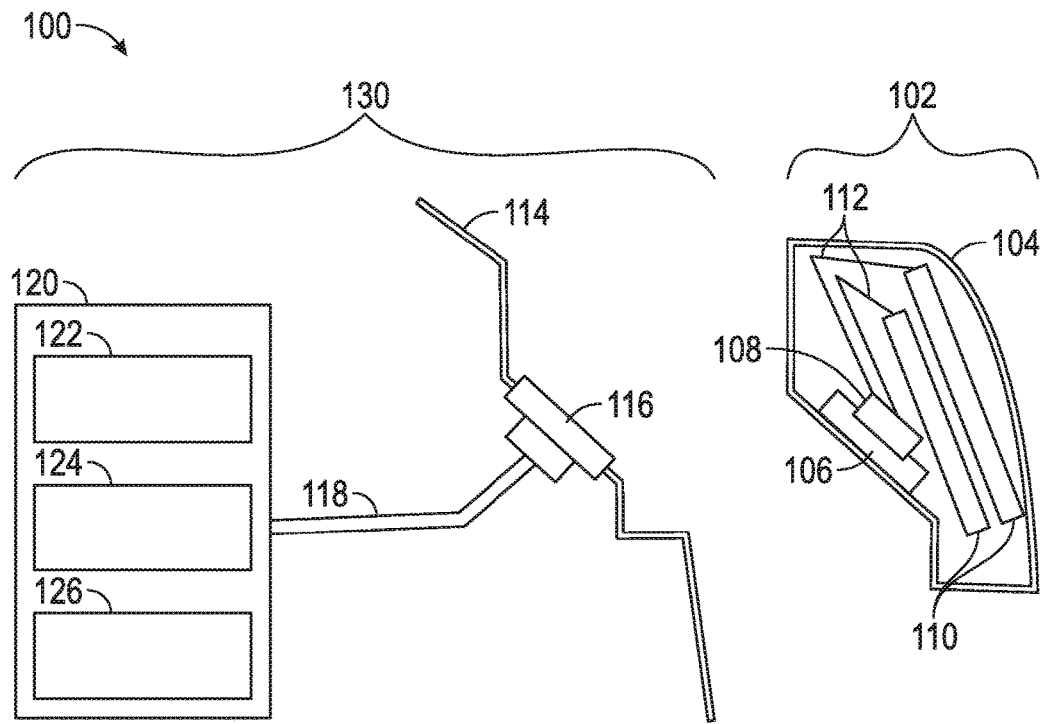
FIG. 1 is a diagram of an external lighting system 100 for operation onboard a vehicle, in accordance with the disclosed embodiments.

FIG. 1 is a diagram of an external lighting system 100 for operation onboard a vehicle, in accordance with the disclosed embodiments. It should be appreciated that FIG. 1 depicts a simplified embodiment of the external lighting system 100, and that a realistic and practical implementation of the external lighting system 100 may include additional elements or components. As shown, the external lighting system 100 includes an external light fixture 102 and a control system 130 for operating the external light fixture 102.

The external light fixture 102 may be implemented using a headlamp, a tail lamp, or any type of external lighting device applicable for operation onboard a vehicle. In the embodiment shown, the external light fixture 102 is a sealed structure. In other words, the external light fixture 102 includes a sealed housing 104 that contains internal circuitry, hardware, and/or other contents used in operation of the external light fixture. The sealed housing 104 encases the external light fixture 102. The sealed housing 104 is "sealed" because it does not include holes or other openings into the external light fixture 102, thereby preventing leaks and protecting the internal contents of the external light fixture 102 from water, contaminants, and other debris. The internal hardware and circuitry of the external light fixture 102 includes a light fixture transceiver 106, a microprocessor 108, one or more light bulbs 110, and internal wiring 112.

The light fixture transceiver 106 may be implemented using any standard transceiver compatible with a single-line and/or multi-line, serial communication protocol. Exemplary embodiments of compatible transceivers may include, without limitation: wireless power transfer (WPT) transceivers, magnetic resonant coupling (MRC) transceivers, local interconnect network (LIN) transceivers, and/or controller area network (CAN) transceivers. In some embodiments, the light fixture transceiver 106 may include a single transceiver, or one or more transceivers, wherein each transceiver is configured as a transmitter and a receiver. Some embodiments, however, may include any number of transmitters and receivers appropriate to the application.

The light fixture transceiver 106 is configured to receive wireless signals for power and communication for the external light fixture 102. Power signals are received and used to provide electrical energy for operation of the external light fixture 102. Communication signals are received and interpreted to provide an instruction set for operating the external light fixture 102. The microprocessor 108 may be implemented using any combination of one or more processors and some type of system memory (as described below with regard to the control system 130). The microprocessor 108 interprets the communication signals received by the light fixture transceiver 106 to identify the instruction set, and initiates various operations of the external light fixture 102, based on the instruction set from one or more communication signals. The light fixture transceiver 106 is further configured to transmit wireless signals providing diagnostic information, status information, or other information associated with the external light fixture 102.

The light bulbs 110 may be implemented using any type of bulb appropriate to light fixtures onboard a vehicle. In exemplary embodiments, the light bulbs 110 may be implemented using one or more light emitting diodes (LEDs). Other embodiments, however, may use organic light emitting diodes (OLEDs). The internal wiring 112 is configured to transmit signals between the microprocessor 108 and the light bulbs 110, and may be implemented using any wiring appropriate for automobile light fixture applications.

In the embodiment shown, the external light fixture 102 is not physically connected to wiring onboard the vehicle (i.e., wiring external to the sealed housing 104 of the external light fixture 102). Here, the light fixture transceiver 106 is used to transmit and receive communication and power signals between the external light fixture 102 and other systems onboard the vehicle, rendering additional wiring is unnecessary. In other embodiments, the external light fixture 102 may be connected to a reduced number of wires, rather than eliminating all wiring connecting the external light fixture 102. Here, the light fixture transceiver 106 transmits and receives one or more communication and power signals, while the external light fixture 102 may receive and/or transmit certain designated signals via wiring.

The control system 130 for operating the external light fixture 102 is implemented onboard a vehicle, and may include any hardware elements, software elements, and other features necessary to operate the external light fixture 102. Moreover, a practical implementation of the control system 130 will include additional elements and features that support conventional functions and operations. The control system 130 may include, without limitation: a control unit 120, a wire harness 118, and a control system transceiver 116 in a sheet metal pocket 114 designed to hold the external light fixture 102 onboard the vehicle. These elements and features of the control system 130 may be operatively associated with one another, coupled to one another, or otherwise configured to cooperate with one another as needed to support the desired functionality—in particular, operating the external light fixture 102, as described herein. For ease of illustration and clarity, the various physical, electrical, and logical couplings and interconnections for these elements and features are not depicted in FIG. 1. Moreover, it should be appreciated that embodiments of the control system 130 will include other elements, modules, and features that cooperate to support the desired functionality. For simplicity, FIG. 1 only depicts certain elements that relate to the techniques described in more detail below.

The control unit 120 is suitably configured to provide an instruction set and electrical energy for the external light fixture 102, and to transmit these power and communication signals to the control system transceiver 116 for further transmission to the external light fixture 102. In certain embodiments, the control unit 120 is implemented using an electronic control unit (ECU), or a combination multiple ECUs, onboard a vehicle. In some embodiments, the control unit 120 is implemented using a particular type of ECU such as, for example, a body control module (BCM). The control unit 120 generally includes, without limitation, at least one processor 122, system memory 124, and a light fixture control module 126.

The at least one processor 122 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 122 may be realized as one or more microprocessors, controllers, microcontrollers, or state machines. Moreover, the at least one processor 122 may be implemented as a combination of computing devices, e.g., a combination of digital signal processors and microprocessors, a plurality of microprocessors, one or more microprocessors in conjunction with a digital signal processor core, or any other such configuration.

The control unit 120 could include system memory 124 integrated therein and/or system memory 124 operatively coupled thereto, as appropriate to the particular embodiment. In practice, the system memory 124 could be realized as RAM memory, flash memory, EPROM memory, EEPROM memory, registers, a hard disk, a removable disk, or any other form of storage medium known in the art. In certain embodiments, the system memory 124 includes a hard disk, which may also be used to support functions of the control unit 120. The system memory 124 can be coupled to the at least one processor 122 such that the at least one processor 122 can read information from, and write information to, the system memory 124. In the alternative, the system memory 124 may be integral to the at least one processor 122. As an example, the at least one processor 122 and the system memory 124 may reside in a suitably designed application-specific integrated circuit (ASIC).

The light fixture control module 126 is suitably configured to generate and provide appropriate control instructions, commands, and/or signals for operation of the external light fixture 102. In practice, the light fixture control module 126 may be implemented with (or cooperate with) the at least one processor 122 to perform at least some of the functions and operations described in more detail herein. In this regard, the light fixture control module 126 may be realized as suitably written processing logic, application program code, or the like.

The light fixture control module 126 initiates transmission of electrical energy, in the form of a power signal, to the external light fixture 102. The power signal originates at the vehicle battery, and is received by the control unit 120 for further transmission to the external light fixture 102. In addition to the transmission of electrical energy, the light fixture control module 126 further provides a communication signal to the external light fixture 102. Here, the control unit 120 may be unaware of the existence of the light fixture 102. In some embodiments, the control unit 120 communicates over a local interconnect network (LIN), oblivious to the fact that a wireless lamp is installed. At the base of the light fixture 102 a LIN receiver (i.e., transceiver 106) and a controller (i.e., microcontroller 108) transform received signals into a wireless power transfer (WPT) signal generated locally at the base. In other embodiments, the control unit 120 transmits a WPT signal over existing, dedicated LIN wires that are amplified at the base to the levels needed for power transfer and communication. In still other embodiments, the control unit 120 transmits over power lines that are selected by the base, processed, and relayed over WPT to the light fixture 102.

The communication signal transmitted by the light fixture control module 126 includes an instruction set for operation of the external light fixture 102. The instruction set is created by the light fixture control module 126 when a user input signal is received at the vehicle, indicating that the user is attempting to operate the external light fixture 102 in some way. For example, the user may execute a turn signal onboard the vehicle. Here, the control unit 120 receives and interprets the user input, creates an instruction set based on the user input, and transmits the instruction set to the external light fixture 102 for performing a turn signal (e.g., a timed flashing of at least a portion of the hardware of the external light fixture 102). In this example, the external light fixture 102 receives and executes the instruction set, resulting in operating the external light fixture 102 according to the user input instructions. In certain embodiments, the light fixture control module 126 is configured to transmit an instruction set requesting diagnostics and/or status information from the external light fixture 102. In this example, the external light fixture 102 receives and executes the instruction set, resulting in a return communication (i.e., a communication from the external light fixture 102 to the control system 130) that includes the requested diagnostics and/or status information.

The control unit 120 provides the above-described power signals and communication signals to the external light fixture 102 by transmitting the signals to the control system transceiver 116 via a wire harness 118. The wire harness 118 is communicatively coupled to the control unit 120, and in certain embodiments, the wire harness 118 may be implemented using any standard wire harness for use onboard a vehicle and compatible with single-line and/or multi-line, serial communication. In certain embodiments, the wire harness 118 transmits communication signals compatible with a local interconnect network (LIN) communication protocol. It should be appreciated that, although a wire harness 118 may be used in exemplary embodiments of the present invention, practical applications of the invention may use any method of signal transmission appropriate to vehicle onboard communication.

Similar to the light fixture transceiver 106, the control system transceiver 116 may be implemented using any standard transceiver compatible with a single-line and/or multi-line, serial communication protocol. In certain embodiments, the control system transceiver 116 may include a single transceiver, or one or more transceivers, wherein each transceiver is configured as a transmitter and a receiver. Some embodiments, however, may include any number of transmitters and receivers appropriate to the application.

The control system transceiver 116 is positioned or embedded in a sheet metal pocket 114 that is used to hold the external light fixture 102. The control system transceiver 116 seals the sheet metal pocket 114, preventing water and other debris from entering the trunk of the vehicle. The use of the control system transceiver 116 (which seals the sheet metal pocket 114) in combination with the light fixture transceiver 106 (which is located inside a sealed housing 104 for the external light fixture 102) provides a fully functioning external lighting system 100 that prevents damage to the vehicle and/or external light fixture 102 due to leaks, water damage, damage due to debris, or the like.

The control system transceiver 116 is configured to receive, from the control unit 120, signals for power and communication for the external light fixture 102, and to transmit, wirelessly, the power signals and communication signals to the external light fixture 102 via the light fixture transceiver 106. An exemplary embodiment of the internal structure of the transceivers used to transmit and receive the power signals and communication signals between a control system transceiver 116 and a light fixture transceiver 106 is illustrated below with regard to FIG. 2.

Figure 2:
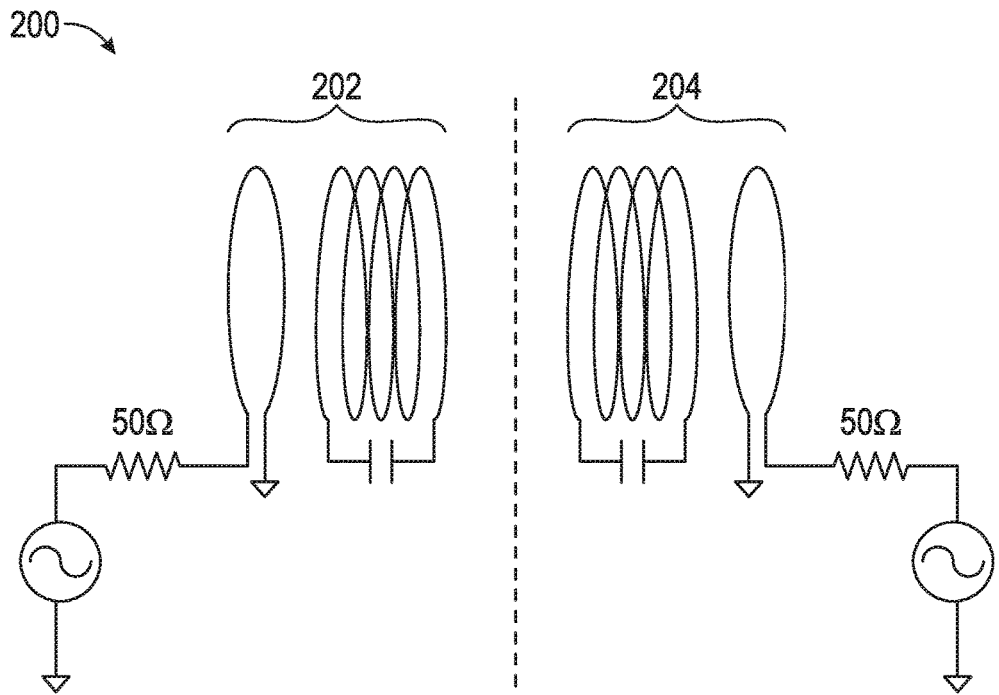
FIG. 2 is a diagram of internal transceiver circuitry, in accordance with the disclosed embodiments.

FIG. 2 is a diagram of internal transceiver circuitry 200, in accordance with the disclosed embodiments. As shown, the internal transceiver circuitry 200 includes circuitry for two transceivers. Each transceiver includes one or more coils used for transmitting and/or receiving power signals and communication signals. For purpose of this example, the first coil set 202 may be associated with a control system for a light fixture and the second coil set 204 may be associated with the light fixture, as described above with respect to FIG. 1. In certain embodiments, the first coil set 202 and/or the second coil set 204 is implemented using a single coil. In some embodiments, one or both of the first coil set 202 and the second coil set 204 are implemented using more than one coil. In this example using more than one coil, each coil set behaves as if it included only one coil.

The first coil set 202 is configured to transmit power signals and communication signals for operation of the external light fixture, and the second coil set 204 is configured to receive the transmitted power signals and communication signals. This transmitting-and-receiving process is accomplished at each coil set, and thus at each transceiver, using the same coil(s) for power and communication signals, using a common frequency for power and communication signals, and wherein the power signal and the communication signal are transmitted and received simultaneously.

In certain embodiments of the first coil set 202 and the second coil set 204, the power signals and the communication signals are transmitted by a first single coil and received by a second single coil. In other words, instead of transmitting power signals using a separate transmission apparatus than that used to transmit communication signals, the first coil set 202 transmits both signals using the same coil at the same frequency. When the first coil set 202 and/or the second coil set 204 is implemented using more than one coil, the same combination of coils that transmit the power signal also transmits the communication signal. In other words, the power signal and the communication signal are transmitted from a common coil or a common coil set.

As shown, the internal transceiver circuitry 200 is configured to provide a wireless power transfer (WPT) from the first coil set 202 to the second coil set 204. Here, the communication protocol is embedded into the same coils (i.e., the first coil set 202 and the second coil set 204) that are transferring power from one transceiver to another, thus providing communication signals and power to the external light fixture onboard the vehicle. Exemplary embodiments of the invention use Binary Phase Shift Keying (BPSK) to carry out communication over the WPT coils. However, it should be appreciated that other embodiments of the present invention may employ other methods for providing communication signals over the same coils used for WPT, such as M-phase shift keying (M-PSK), quadrature amplitude modulation (QAM), differential BPSK (DBPSK), or the like.

In certain embodiments, the internal transceiver circuitry may be configured to provide isolated electrical systems for each function of an external light fixture. For example, a single transmitting coil may be used for a turn signal function, a second single transmitting coil may be used for a brake-light function, and a third single transmitting coil may be used for a standard tail light function. In this example, each function is associated with an individual circuit, and therefore each function is electrically isolated from other functions. Electrically isolated circuits may be implemented using multiple transceivers on the control system side and on the external light fixture side. A system configured in this way provides the benefits of an isolated power supply for the hardware associated with each function, and when a particular function becomes inoperable, the other functions remain usable.

Figure 3:
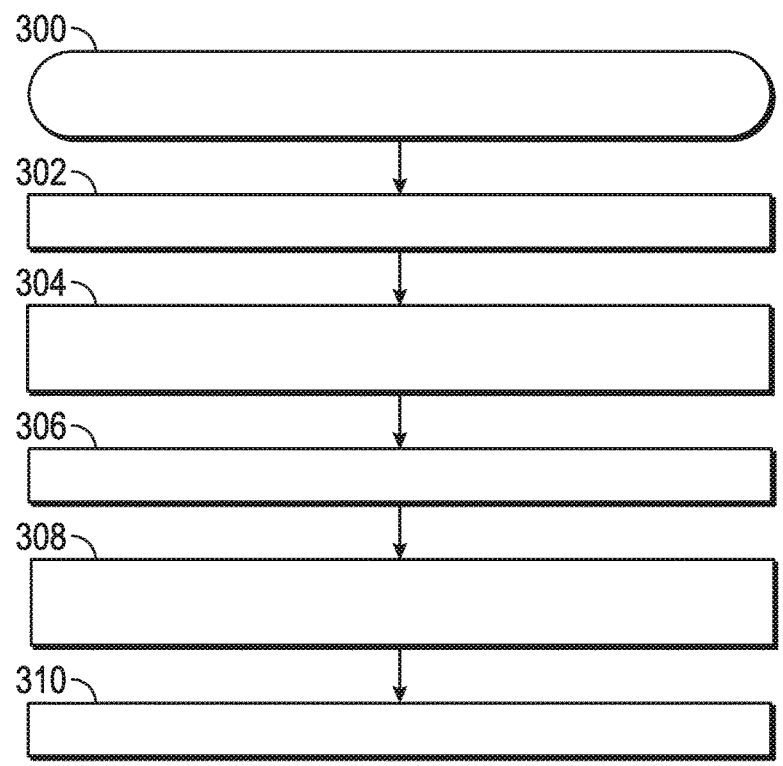
FIG. 3 is a flow chart that illustrates an embodiment of a process for operating an external light fixture control system onboard a vehicle.

FIG. 3 is a flow chart that illustrates an embodiment of a process 300 for operation of a control system for an external light fixture onboard a vehicle. The various tasks performed in connection with process 300 may be performed by software, hardware, firmware, or any combination thereof. For illustrative purposes, the following description of process 300 may refer to elements mentioned above in connection with FIGS. 1-2. In practice, portions of process 300 may be performed by different elements of the described system. It should be appreciated that process 300 may include any number of additional or alternative tasks, the tasks shown in FIG. 3 need not be performed in the illustrated order, and process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

First, the process 300 receives a battery voltage from the vehicle battery (step 302), and converts the battery voltage to a power signal appropriate for wireless transmission to an external light fixture (step 304). The power signal appropriate for wireless transmission is a fixed frequency power signal in the kHz-MHz range.

The process 300 then receives an external light fixture operation signal (step 306). The external light fixture operation signal may be received as a result of user input and/or as a result of an automatic operation onboard the vehicle. For example, a user may provide input by activating a lever inside the vehicle to execute a turn signal. As another example, the vehicle may have headlights and/or tail lights that automatically activate when certain outside conditions are met (e.g., the windshield wipers are activated indicating that the weather is rainy, or it is dark outside). In this example, when the vehicle receives a signal indicting that the outside conditions are met, the vehicle provides an operation signal to the external light fixture to activate (i.e., initiate operation of) the external light fixture.

The external light fixture operation signal may also include a request from a control system or diagnostics system onboard the vehicle, requesting status and/or diagnostics information from the external light fixture. Status and diagnostics information may include reporting when a light bulb or LED is damaged, when a function of the external light fixture is not operational, or when any of the hardware or circuitry in the external light fixture is not functioning.

Next, the process 300 converts the operation signal to a communication signal for wireless transmission to the external light fixture (step 308). The communication signals are modulated over the power signal. The communication signals are much lower in amplitude, therefore only small changes to the overall signal's Q are observed (e.g., the efficiency of the WPT system remains high).

The process 300 then transmits the power signal and the communication signal (step 310). Here, the process 300 transmits the power signal and the communication signal using the same coil or coils. The process 300 uses a single coil (or set of coils) to transmit both signals. In some embodiments, the process 300 transmits the power signal and the communication signal over the same coil(s) simultaneously, and in some embodiments, the process 300 transmits the power signal and the communication signal using the same frequency.

Figure 4:
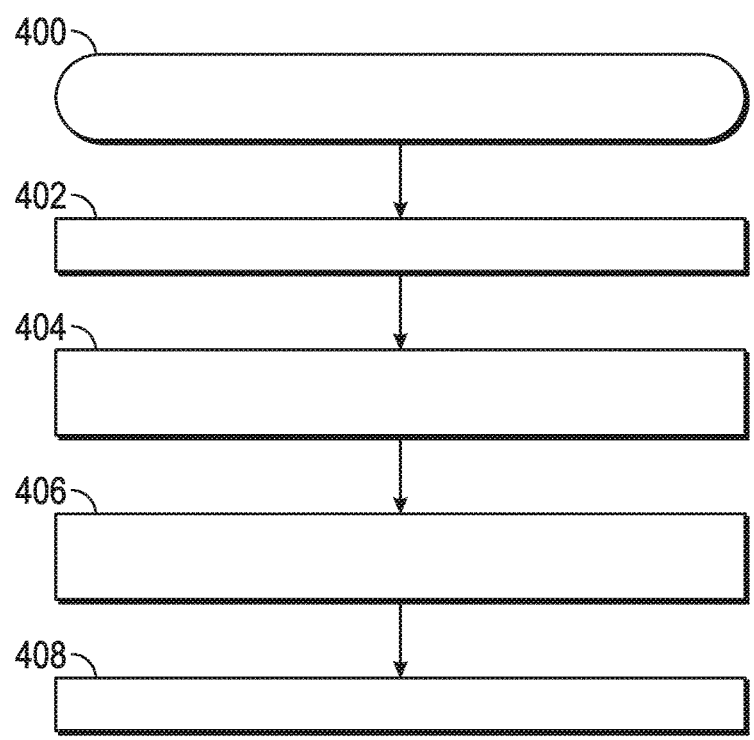
FIG. 4 is a flow chart that illustrates an embodiment of a process for operating an external light fixture onboard a vehicle.

FIG. 4 is a flow chart that illustrates an embodiment of a process 400 for operation of an external light fixture onboard a vehicle. The process 400 is presented from the perspective of the external light fixture, and presents the steps taken at the external light fixture to carry out functionality at the external light fixture. First, the process 400 receives a power signal and as communication signal (step 402). Here, the process 400 receives the power signal and the communication signal using the same coil or coils. The process 400 uses a single coil (or set of coils) to receive both signals. In some embodiments, the process 400 receives the power signal and the communication signal over the same coil(s) simultaneously, and in some embodiments, the process 400 receives the power signal and the communication signal using the same frequency.

The process 400 then uses the power signal to provide electrical energy for operation of the external light fixture (step 404). The power signal is used to provide the electrical energy for the internal hardware of the external light fixture, which may include a microprocessor, one or more light bulbs and/or light emitting diodes (LEDs), and any other hardware or device required to perform functionality of an external light fixture.

Next, the process 400 interprets the communication signal to recognize an instruction set (step 406), and executes the instruction set (step 408). In certain embodiments, the instruction set may include commands applicable to operation of the external light fixture. Operation of the external light fixture may include headlight functionality, tail light functionality, turn signal functionality, hazard signal functionality, sequences of flashes, animations, or any other functionality appropriate for a light fixture onboard a vehicle. In some embodiments, the instruction set may include a request for status information and/or diagnostic information associated with the external light fixture.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A light fixture apparatus for use onboard a vehicle, the light fixture apparatus comprising:
   a sealed external housing, configured to encase the light fixture apparatus;

a transceiver positioned inside the sealed external housing, the transceiver configured to receive a wireless communication signal and a wireless power signal; and at least one processor positioned inside the sealed external housing, the at least one processor configured to operate the light fixture apparatus, using the wireless communication signal and the wireless power signal;

wherein the transceiver comprises a single coil; and wherein the transceiver is further configured to receive the wireless communication signal and the wireless power signal using the single coil.

2. The light fixture apparatus according to claim 1, wherein the transceiver is further configured to receive the wireless communication signal and the wireless power signal simultaneously.

3. The light fixture apparatus according to claim 1, wherein the transceiver is further configured to receive the wireless communication signal and the wireless power signal at a common frequency.

4. The light fixture apparatus according to claim 1, wherein the wireless communication signal comprises an instruction set to carry out an operation of the light fixture apparatus.

5. The light fixture apparatus according to claim 1, wherein the wireless power signal provides power to carry out an operation of the light fixture apparatus.

6. A method for using an external lamp onboard a vehicle, the method comprising:

receiving, at a transceiver positioned inside a sealed casing of the external lamp, a wireless communication signal and a wireless power signal; and operating the external lamp using the wireless communication signal and the wireless power signal;

wherein receiving the wireless communication signal and the wireless power signal further comprises:

obtaining the wireless communication signal and the wireless power signal at a common coil set.

7. The method of claim 6, wherein receiving the wireless communication signal and the wireless power signal further comprises:

obtaining the wireless communication signal and the wireless power signal via a common frequency.

8. The method of claim 6, wherein receiving the wireless communication signal and the wireless power signal further comprises:

obtaining the wireless communication signal and the wireless power signal simultaneously.

9. The method of claim 6, wherein the wireless communication signal comprises an instruction set to carry out an operation of the external lamp.

10. The method of claim 6, wherein the wireless power signal comprises power originating at a battery onboard the vehicle; and wherein the wireless power signal provides power to carry out an operation of the external lamp.

\* \* \* \* \*